United States Patent
Martin et al.

(10) Patent No.: US 7,678,215 B2
(45) Date of Patent: *Mar. 16, 2010

(54) INSTALLATION METHOD FOR NON-SLIP SANITARY FLOORING

(75) Inventors: Joel E. Martin, Charlotte, NC (US); Richard C. Neale, III, Roswell, GA (US)

(73) Assignee: Allied Industries International Inc., Jonesville, SC (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/456,747

(22) Filed: Jul. 11, 2006

(65) Prior Publication Data

US 2008/0014399 A1  Jan. 17, 2008

(51) Int. Cl.
E04F 15/02 (2006.01)
B29C 65/08 (2006.01)
B32B 38/04 (2006.01)

(52) U.S. Cl. .................... 156/71; 156/73.4; 156/267; 156/304.1; 156/304.5; 156/304.6; 156/308.4

(58) Field of Classification Search .............. 156/71, 156/73.4, 250, 267, 304.1, 304.5, 304.6, 156/308.2, 308.4

See application file for complete search history.

(56) References Cited

U.S. PATENT DOCUMENTS

| | | | |
|---|---|---|---|
| 5,466,320 A | 11/1995 | Burt et al. | |
| 5,560,797 A | 10/1996 | Burt et al. | |
| 5,713,165 A | 2/1998 | Erwin | |
| 6,434,897 B1 | 8/2002 | Sievers et al. | |
| 6,449,790 B1 | 9/2002 | Szekely | |
| 6,559,432 B1 | 5/2003 | Moore, Jr. | |
| 6,895,622 B2 | 5/2005 | Szekely | |
| 2003/0093964 A1 | 5/2003 | Bushey et al. | |
| 2005/0167025 A1 | 8/2005 | Kobayashi et al. | |

FOREIGN PATENT DOCUMENTS

| | | |
|---|---|---|
| DE | 2004163 A1 | 8/1971 |
| DE | 3724784 A1 | 2/1989 |
| DE | 19940837 A1 | 11/2000 |
| DE | 102005045043 A1 | 3/2006 |
| EP | 1304427 A2 | 4/2003 |
| FR | 2675078 A1 * | 10/1992 |
| GB | 555674 A | 9/1943 |

OTHER PUBLICATIONS

English Abstract of FR 2,675,078.*
Web Translation of a section of FR 2,675,078.*
Freeman MFG., "Users Guide to Adhesives", pp. 1-6, http://www.freemansupply.com/datasheets/adhesivesguide.pdf, downloaded on Jul. 12, 2007.

(Continued)

*Primary Examiner*—Philip C Tucker
*Assistant Examiner*—Sing P Chan
(74) *Attorney, Agent, or Firm*—Summa, Additon & Ashe, P.A.

(57) ABSTRACT

A method of installing flooring and resulting structure are disclosed. The method is particularly useful for sanitary non-slip applications such as kitchens. The method includes the steps of positioning a first sheet of polymer flooring material with an upwardly-facing step cut along one edge of the first sheet on a floor to be covered, and applying a second sheet of polymer flooring material with a complementary downwardly-facing step cut along one edge of the second sheet to the upwardly facing step cut of the first sheet and to the floor adjacent the first sheet while concurrently sealing the respective faces to one another in a step lap joint.

12 Claims, 4 Drawing Sheets

OTHER PUBLICATIONS

International Search Report and Written Opinion in corresponding International Application No. PCT/US2007/073242, mailed on Oct. 23, 2007.

International Preliminary Report on Patentability in counterpart International Application No. PCT/US2007/073242, mailed on Nov. 26, 2008.

* cited by examiner

INSTALLATION METHOD FOR NON-SLIP SANITARY FLOORING

BACKGROUND

The present invention relates to flooring materials and in particular relates to joints in certain types of polymer-based flooring materials that are used in non-slip (or "non-skid") applications, sanitary applications, and applications in which both non-slip and sanitary characteristics are desired or necessary.

Certain structural elements in commercial or other public establishments must meet the requirements of various local, state or federal codes. For example, a restaurant is typically governed by local health and sanitation codes, and if it meets certain other criteria, may also be subject to state and federal health and safety requirements such the Occupational Health and Safety Act (29 U.S.C. § 651 et seq.) and related regulations such as (but not limited to) 29 CFR 1910.21-1910.30.

In most circumstances, a restaurant must be floored with a material that can be maintained at, or if necessary brought to, the highest sanitary standards. Additionally, restaurant flooring, particularly kitchen (or other food handling and preparation areas), should be formed of a material that helps prevent workers from slipping when the floor is wet or otherwise soiled with food or food preparation materials.

The concurrent requirements for high standards of sanitation and non-slip (non-skid) characteristics can be at odds with one another in certain structures. For example, some non-slip surfaces are prepared by mixing a polymer or paint with a solid (grit) material and applying the polymer in a manner analogous to painting to produce a surface with embedded abrasive particles. Non-slip flooring is also often produced by forming a three-dimensional pattern in the flooring material itself.

Alternatively, surfaces intended for sanitary use are often preferably as smooth as possible so that they can be easily cleaned on a frequent basis and so that they avoid structural elements that can trap dirt or other undesired items that can contribute to unsanitary conditions.

Typical materials for commercial kitchen flooring (although certainly applicable to residential areas as well) have included wood, concrete or cement, and ceramic and non-ceramic tile. Each of these offers certain advantages and disadvantages depending upon the particular circumstances.

More recently, polymer materials have become favored for these applications. As in many other circumstances, polymers are (usually) low in relative cost as compared to wood or ceramic tile, are widely available and offer a range of desirable properties.

Some of these polymer materials are available in pre-cured form, typically liquids. They are then applied using brushes, rollers or squeegee-type tools. Such pre-cured polymers can be applied to a wide variety of surfaces and because of their liquid form, need not be precut or otherwise dimension the cause they (like all liquids) simply take the shape of their container, which in this case is the floor.

As potential disadvantages, however, materials applied as liquids typically require a finite drying time, may produce undesired (or even regulated) solvent vapors, may not stick well to certain underlying surfaces and may require sophisticated priming or be limited to certain surface materials.

Accordingly, other polymers are available in cured sheets that can simply be positioned as desired all on a floor to be covered.

For example, certain vinyl (e.g. polyvinyl chloride or "PVC") polymers can be easily manufactured into sheets or rolls of relatively large size (e.g., one quarter inch thick sheets of five feet by eight feet or rolls of the equivalent width and much greater length). Such sheets can provide cushioning surfaces (important to those who work on their feet for extended periods of time), that can be easily cleaned and maintained at the necessary sanitary standards, and that provide a greater grip in many circumstances then materials such as wood or ceramic tile. Examples of such material are set forth in U.S. Pat. Nos. 5,466,320 and 5,560,797 among others and commercially available materials are sold under the PROTECT-ALL® trademark (Oscoda Plastics, Inc. Oscoda, Mich., USA).

Because the polymer is manufactured and transported in sheet form (whether as discrete stacked sheets or rolls), the sheets in turn must be fitted to the particular flooring application. This may require cutting the sheets to fit particular floor designs and also connecting the sheets to one another in a manner that—where required—preserves the sanitary surface. Stated differently, merely placing individual PVC sheets on a floor does not complete the necessary sanitary arrangements because food can gather at the unsealed joints and in turn encourage the growth of unsanitary bacteria.

An appropriate joint should resist forces of tension, compression, shear, cleavage, and peel. These can be addressed through various structural arrangements, including joints with additional layers of reinforcing material. In flooring applications, however, joints that change the otherwise (usually) level flooring may be unacceptable. Thus, simple overlapping joints create a bump as do tapered overlapping joints, single or double strap joints, and tapered strap joints. Similarly, using profiles (i.e., additional structural pieces) to create the joint may be acceptable for some purposes, but can create a slight bump that is unacceptable in other circumstances. For the same reasons, the types of reinforced and U-shaped joints that can be used to connect metal sheeting in non-flooring applications are generally unacceptable for kitchen or other sanitary flooring. In addition to the bumps that they create, the bends and three-dimensional structures that they include can defines spaces that are hard to clean and that can provide a incubation point for bacteria.

Accordingly, when installing PVC flooring in a food service (kitchen) application, the individual sheets must are often welded to one another to form the joint. This is typically carried out by placing two sheets in abutting relationship, cutting a V-shaped channel that removes a portion of each abutting sheet (e.g. with a router) and then welding the sheets together using a PVC rod or bead while applying heat.

Although this technique has satisfactory applications, it requires both the routing and welding steps. Because the seams are abutting, they also have a tendency to separate or potentially fail, leading to some of the safety and sanitary problems described above.

Accordingly, a need exists for improved methods of joining such polymer-based flooring in food service and related applications.

SUMMARY OF THE INVENTION

In one aspect the invention is a method of installing flooring that is particularly useful for sanitary, non-slip applications such as kitchens. In this aspect the method includes the steps of positioning a first sheet of polymer flooring material with an upwardly-facing step cut along one edge of the first sheet on a floor to be covered, and applying a second sheet of polymer flooring material with a complementary downwardly-facing step cut along one edge of the second sheet to the upwardly facing step cut of the first sheet and to the floor adjacent the first sheet while concurrently sealing the respective faces to one another in a step lap joint In another aspect, the invention is a floor covering. In this aspect, the invention includes a first sheet of polymer material with at least one step cut edge facing upwardly from the floor, a second sheet of polymer material with at least one step cut edge facing downwardly towards the floor and immediately overlying the upwardly facing step cut of the first sheet, and a heat seal joining the upwardly-facing step cut to the downwardly-facing step cut and thereby joining the first and second sheets of polymer material together all on the floor.

In another aspect, the invention is a method of repairing a butt joint in polymer flooring materials. The method includes the steps of forming a step cut in polymer flooring on both adjacent sides of an existing butt joint, and sealing a strap of polymer material into the step cut above the remainder of the butt joint to produce a combination strap and step lap joint to replace the butt joint.

In yet another aspect, the invention is a portion of flooring material on a floor. The structure includes a first sheet of polymer flooring material, a second sheet of polymer flooring material abutting the first sheet along respective edges of each sheet, a partial butt joint between the first and second sheets adjacent the floor, a channel, portions of which extend into each of the first and second sheets above the partial butt joint, a polymer strap positioned in the channel above the partial butt joint, and a seal between and among the polymer strap, the first sheet of polymer flooring material and the second sheet of polymer flooring material that forms a combined strap and lap joint between and among the first sheet, the second sheet, and the strap.

The foregoing and other objects and advantages of the invention and the manner in which the same are accomplished will become clearer based on the followed detailed description taken in conjunction with the accompanying drawings.

DETAILED DESCRIPTION

The invention is a method of joining non-slip (non-skid) polymer sheet flooring materials suitable for sanitary use in a manner that improves the quality of the resulting seam while minimizing the problems raised by joints in general and welded joints in particular.

Figure 1:
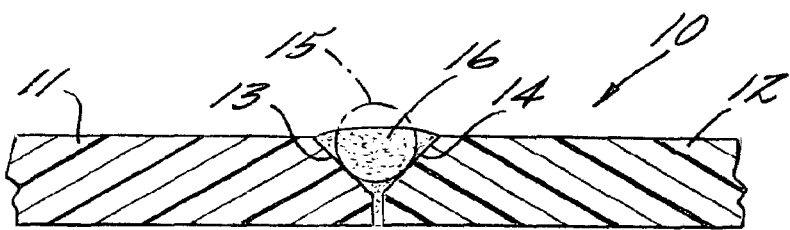
FIG. 1 illustrates a prior art welded joint between two pieces of PVC flooring.

For background purposes, FIG. 1 illustrates a prior art joint broadly designated at 10. The joint is formed of respective portions 11 and 12 of polymer flooring, typically PVC as described earlier. In order to produce the joint 10, a router is used to cut enough material from each of the sheets 11 and 12 to define the respective oblique surfaces 13 and 14. A bead of welding material (usually, but not necessarily the same material as the flooring) indicated by the dotted circle 15 is applied between the surfaces 13 and 14 and melted to form the joint 16.

Figure 2A:
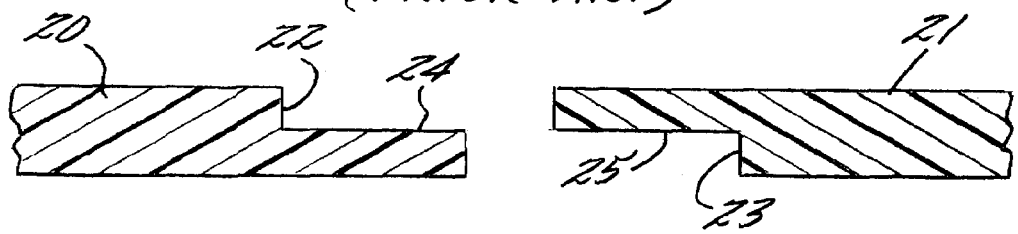
FIGS. 2A and 2B illustrate a lap joint according to the present invention.
Figure 2B:
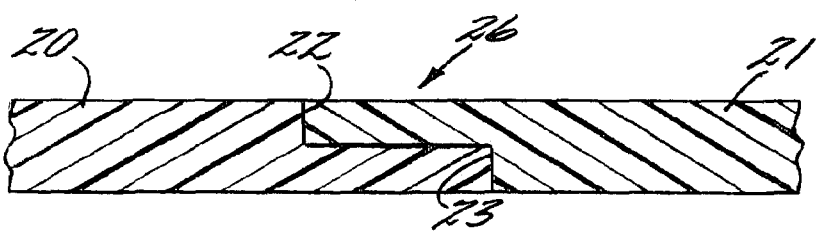

FIGS. 2A and 2B illustrate a step lap joint according to the present invention. The step lap joint is formed between respective first and second portions 20 and 21 of the PVC material. Each of the pieces 20 and 21 includes a cut portion that defines the respective vertical step risers 22, 23 and the horizontal steps 24, 25.

When these pieces are brought together as illustrated in FIG. 2B they form the step lap joint broadly designated at 26.

Figure 4:
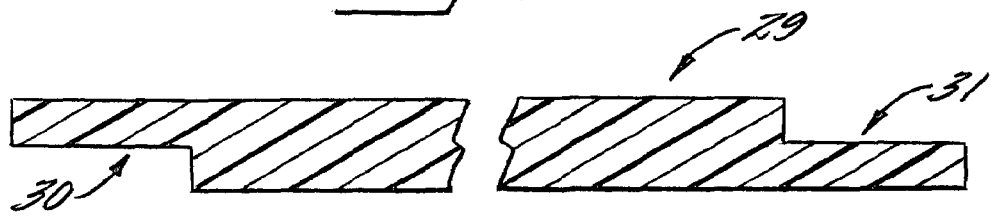
FIG. 4 is a cross-sectional view of a sheet of polymer flooring material for use in the present invention.

Accordingly, in one embodiment the invention can comprise the portion of PVC flooring material illustrated at 7 in FIG. 4 that includes a pair of steps 30 and 31 on either edge, with the steps being oriented opposite to one another with respect to the plane of the material 29 so that multiple pieces the same as the illustrated piece 27 can be easily joined to form the step lap joints illustrated in FIGS. 2A and 2B.

In its broadest aspects, the method comprises positioning a sheet 20 of thermoplastic flooring material with an upwardly facing step cut 24 along one edge of the first sheet 20 on a floor 19 (e.g., FIG. 5) to be covered and then applying a second sheet 21 of thermoplastic polymer flooring material with a complementary downwardly facing step cut 25 along one edge of the second sheet 21 to the upwardly facing step cut 24 of the first sheet 20 and to the floor 19 adjacent the first sheet while concurrently forming a seal, usually by applying sufficient heat to the respective step faces to melt the polymer.

Polyvinyl chloride (PVC) is a widely used material for the respective sheets 20 and 21, but it will be understood that other thermoplastic or thermosetting polymers can be used as desired or necessary. These terms are used in their well-understood sense; i.e. thermoplastic polymers are those which will soften and melt under the application of heat while still retaining their basic chemical composition. Thermosetting polymers tend to undergo some type of chemical reaction—typically cross-linking—under the application of heat. As a result, applying moderate heat to a thermoplastic polymer will cause it to soften, while applying heat to a thermosetting polymer will initially cure it (i.e., the cross-linking reaction). When heat is thereafter applied to a thermosetting polymer, it will not produce softening, but will instead (if sufficient heat is applied) heat the polymer until it burns or degrades In addition to PVC, exemplary thermoplastic polymers include (but are not limited to) polypropylene, polyethylene, polystyrene, ABS (acrylonitrile-butadiene-styrene), nylon, polycarbonate, thermoplastic polyester, polyphenylene oxide, polysulfone and PEEK (poly-ether-ether-ketone). Exemplary thermosetting polymers include (but are not limited to) unsaturated polyester, vinyl ester, epoxy, urethane and phenolic.

The flooring material can also include polymer matrix composite (PMC) resin systems in which a reinforcing material, typically a fiber, is added to the polymer resin to strengthen the finished part. Common fiber reinforcement materials include carbon/graphite, aramid, and glass. Each of these can be present as yarns, rovings, chopped strands, and woven and nonwoven fabrics.

Figure 3:
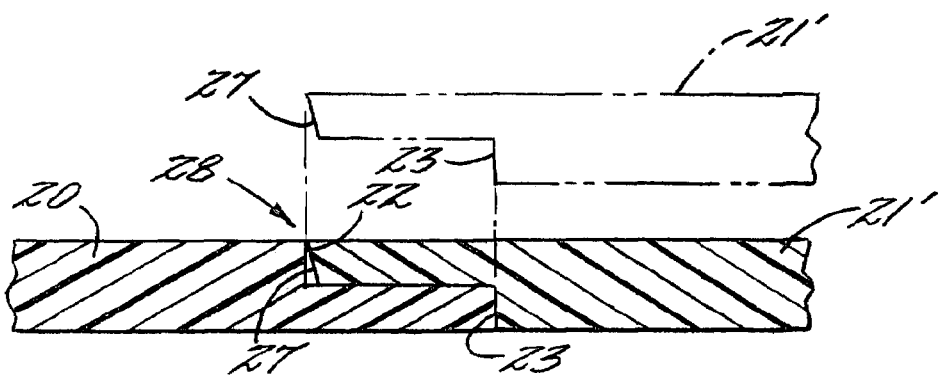
FIG. 3 illustrates a second embodiment of a lap joint according to the present invention.

The method of the invention can include the steps of forming each of the step cuts along one or both edges of a first sheet of polymer flooring material prior to the step of joining the sheets to one another. In one embodiment, the sheet material is formed with complementary step edges so that regardless of orientation the step on one edge always faces opposite from the step on the other edge. FIG. 3 illustrates this embodiment.

This embodiment is also particularly convenient because it defines a single type of sheet that can always be joined to an adjacent sheet of the same construction. Once the first sheet is in place on the floor, the second identically oriented sheet can always be flipped or turned as necessary to present the downwardly-facing step cut to an upwardly-facing step cut.

Alternatively, the sheets can be formed to have identical step cuts along each edge; i.e. both cuts oriented upwardly-facing or both cuts oriented downwardly-facing on any particular piece. Such a structure is also easy to use in the context of the present invention because an individual sheet can again simply be flipped to place it in the proper orientation for use adjacent to an existing sheet on the floor. In both embodiments, the sheets can be quickly and easily placed side-by-side on the floor to produce the final flooring material.

FIG. 3 illustrates a alternative embodiment of the invention in which one edge 27 of the sheet 21' is oblique rather than vertical with respect to the flooring surface. In practicing the invention, it has been found that although a perfectly square step lap joint (FIG. 2B) is possible, in most circumstances using the slight oblique face 27 produces a joint that is more flush at the surface because the extra space created between the oblique face 27 and the second piece of flooring 20 is more forgiving or small misalignments or defects in the flooring material.

Figure 5:
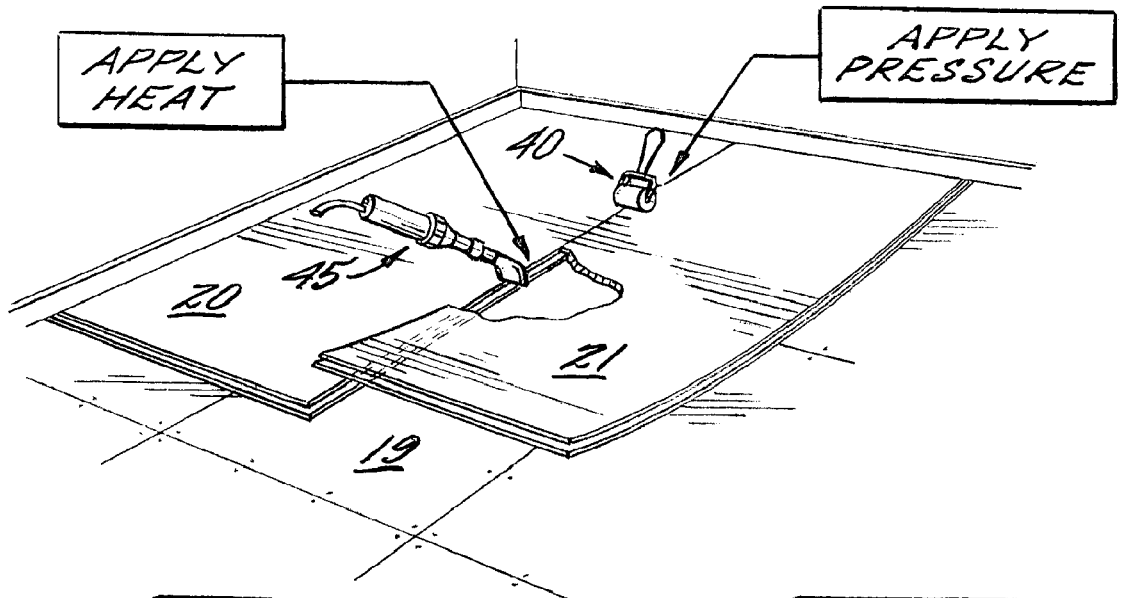
FIGS. 5 and 7 illustrates the method of the invention in context.
Figure 7:
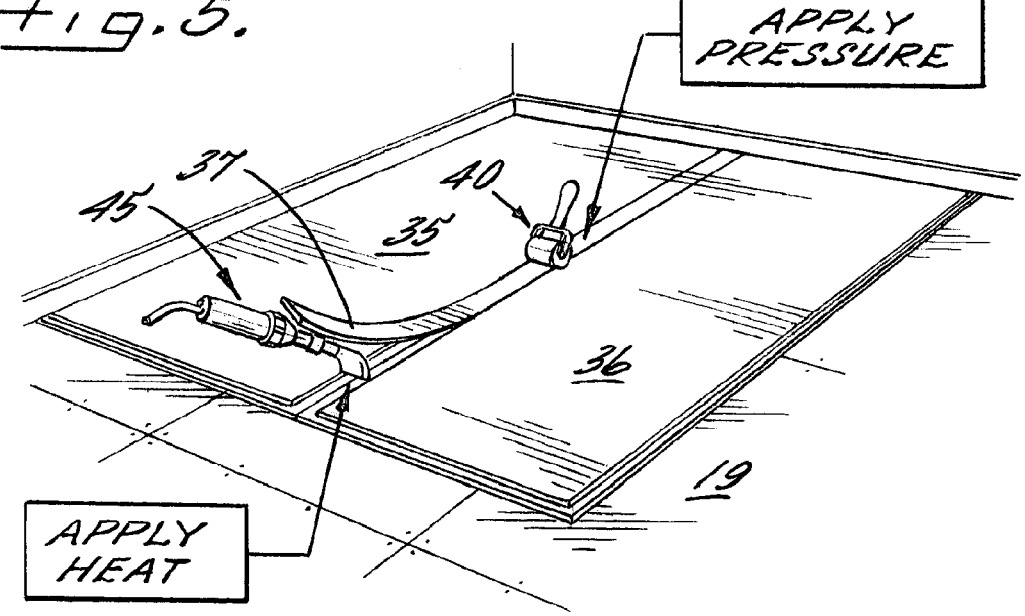

As illustrated in FIGS. 5 and 7, heat is typically applied to the respective step faces in any fashion that raises the temperature to the desired or necessary level without otherwise interfering with the flooring material or the floor. Thus, a tool 45 that produces and applies hot air is particularly convenient because it can raise the temperature of the polymer material to the necessary temperature without placing any physical object in direct contact with the polymer. As a result, the step cuts can be joined to one another in an efficient fashion.

Direct contact (conductive) heating devices can also be used, but in a fashion that does not remove polymer material (i.e. by sticking to the heating device) or otherwise interfering with the flooring material or the floor.

In order to complete the sealing process, pressure is applied to the surface of the second sheet 21 above the downwardly facing step cut. This is illustrated in FIG. 5 in which the first sheet 20 and the second sheet 21 form the step lap joint 26 in the described manner and a weighted roller 30 or equivalent device is used to apply pressure to enhance the joint 26.

Figure 6A:
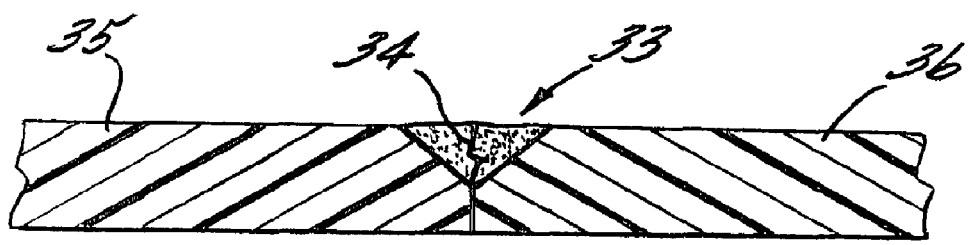
FIGS. 6A through 6D illustrate another embodiment of the invention that can be used to repair existing joints in polymer flooring.
Figure 6B:
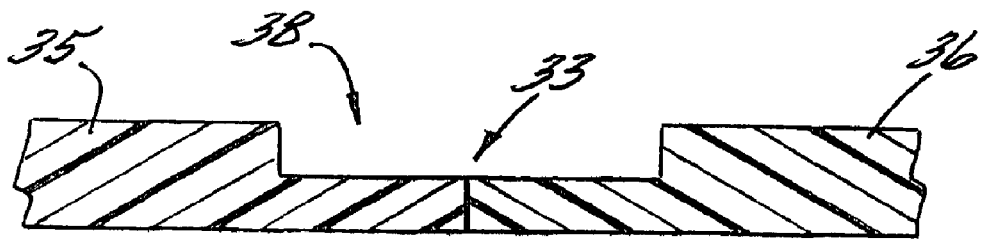
Figure 6C:
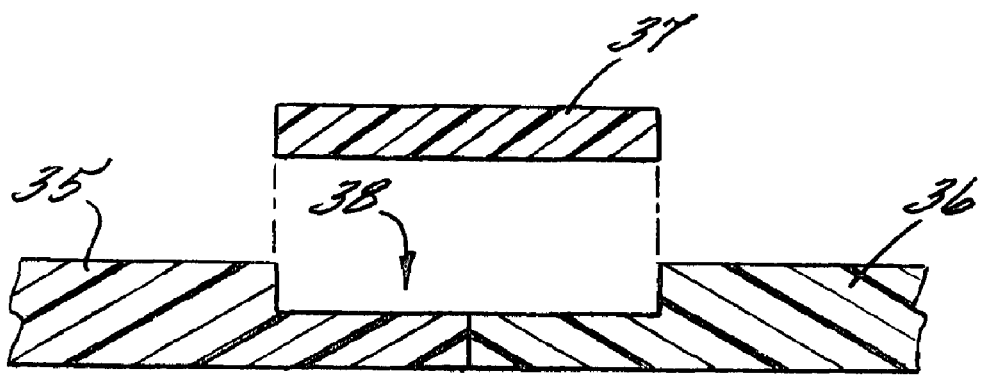
Figure 6D:
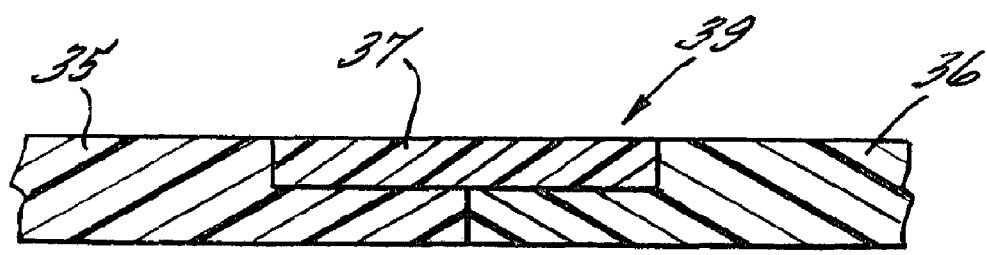

FIG. 7 is entirely analogous to FIG. 5 but shows a new weld or repair being carried out in the manner illustrated in FIGS. 6C and 6D. As in the first embodiment, the welding tool 45 applies heat to the flooring pieces 35 and 36, then the strip 37 is added (typically immediately) over the grooved portion, following which the roller 40 is used to apply pressure (the combination of steps is typically a two-person task).

Both FIGS. 5 and 7 illustrate that all of the exposed edges of the flooring material pieces (20, 21, 35, 36) can be stepped in a manner that is amenable to producing a lap joint; i.e., in end-to-end fashion in addition to side-to-side fashion. It will be understood, of course, that phrases such as "end-to-end" and "side-to-side" are exemplary with respect to rectangular flooring pieces, but do not otherwise limit the shape of the flooring that can be joined using the method of the invention.

Accordingly, in a structural aspect, the invention is a floor covering on a floor 19, with the floor covering comprising a first sheet 20 of polymer material with at least one upwardly facing step cut edge 24 facing upwardly from the floor 19. A second sheet of polymer material 21 has at least one downwardly facing step cut edge 25 facing downwardly towards the floor 19 and immediately overlies the upwardly facing step cut 24 on the first sheet 20. A seal joins the upwardly facing step cut 24 to the downwardly facing step cut 25 and thereby joins the first and second sheets 20, 21 of polymer material together on the floor 19.

As set forth with respect to the method embodiments, at least one (and potentially both) of the first and second sheets 20, 21 is a thermoplastic polymer. Alternatively, at least one (and potentially both) of the first and second sheets 20, 21 can be a thermosetting polymer. In one exemplary embodiment, the sheets 20, 21 are polyvinyl chloride.

FIGS. 6A through 6D illustrate the method of the invention in a repair context. In this context, FIG. 6A illustrates a welded butt joint 33 between respective flooring portions 35 and 36, and analogous to the joint illustrated in FIG. 1, but with a crack 34 that weakens the structure and the resulting integrity of the joint 33.

FIG. 6B illustrates the structure after the step of forming a step cut in the polymer flooring pieces 35 and 36 opposite both sides of the existing butt joint 33.

FIGS. 6C and 6D illustrate the step of sealing a strap 37 of polymer material into the step cut 38 above the remainder of the butt joint 33 to produce a combination strap and step lap joint broadly designated at 40 that replaces the butt joint 33.

FIGS. 6A through 6D illustrate the step cut 38 formed in rectangular cross section with the steps parallel to the surface of the polymer flooring pieces 35 and 36. In the illustrated embodiment, the dimensions of the polymer strap 37 correspond substantially to the dimensions of the step cut 38 to produce a repaired joint 40 in which the strap 37 and the flooring material pieces 35 and 36 create a flush surface with respect one another.

In a manner analogous to the first embodiment, the method can include the step of applying pressure to the strap 37 and to the surface of the polymer flooring material 35 and 36 to enhance the resulting joint. The strap 37 can be sealed to the step cut 38 with an adhesive, but in a manner analogous the previous embodiment, is typically heat sealed based upon the thermoplastic or thermosetting characteristics of both the polymer flooring pieces 35, 36 and the strap material 37.

In a structural context, FIGS. 6A through 6D illustrate a first sheet of polymer flooring material 35, a second sheet of polymer flooring material 36 abutting the first sheet 35 along respective edges of each sheet, and a partial butt joint 33 between the first and second sheets 35, 36 adjacent the floor (19, FIG. 5). A channel illustrated as the step cut 38 has portions that extend into the each of the first and second sheets 35, 36 above the partial butt joint 33. A polymer strap 37 is positioned in the channel 38 above the partial butt joint 33, and is sealed (integral with the structure and thus not illustrated separately) between and among the polymer strap 37, the first sheet of polymer flooring material 35 and the second sheet of polymer flooring material 36. The resulting structure forms a combined strap and lap joint 40 between and among the first sheet 35, the second sheet 36, and the strap 37.

As in the other embodiments, the first and second sheets 35 and 36 and the strap 37 are selected from among thermoplastic and thermosetting polymers, typically including polyvinyl chloride, with the seal being a heat seal between and among the sheets 35, 36 and the strap 37. As illustrated in FIGS. 6C and 6D, in exemplary embodiments the polymer strap 37 has dimensions substantially the same as the step cut channel 38 and as illustrated the channel 38 and the strap 37 are rectangular in cross section.

Figure 8:
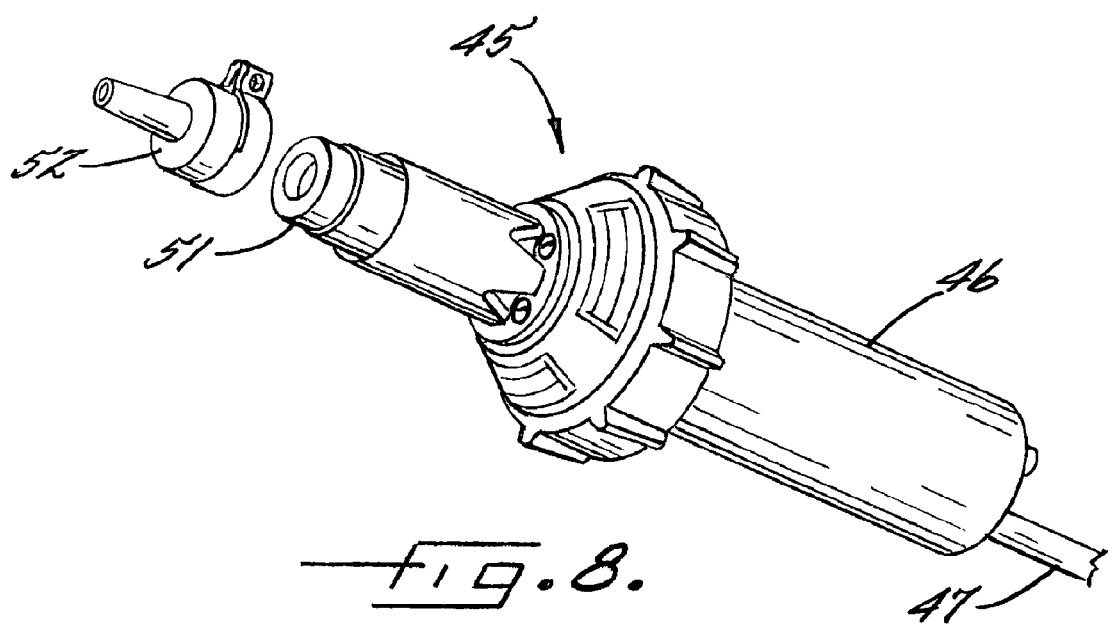
FIGS. 8 and 9 illustrate tools for welding plastic that are exemplary of those used in the present invention.
Figure 9:
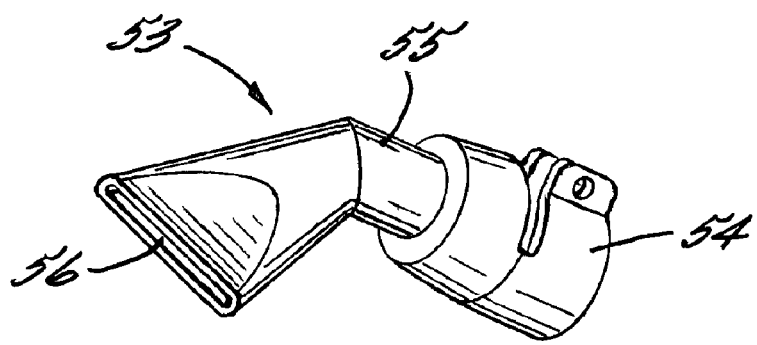

FIGS. 8 and 9 illustrate tools for welding plastic that are exemplary of those used in the present invention. FIG. 8 is a perspective view of a hot air tool 45 that can (depending upon the particular model) operate on 120 volt, 230 volt, or 1600 watt systems. The tool 45 can produce hot air at temperatures up between about 50 and 600° C. at airflow volumes of up to 200 liters per minute.

As illustrated, the tool 45 includes a handle 46, a power cord 47 a housing 50, and a hot air tube 51. FIG. 8 also illustrates a conventional nozzle 52 used on the tool 45.

Representative tools are commercially available with one source including Leister direct, Bolton, United Kingdom (www.leister.co.uk).

FIG. 9 illustrates a modified nozzle broadly designated at 53 that has been found useful in carrying out the method of the invention. The modified nozzle 53 includes a female cup 54 for adapting to the tube 51. An elbow tube 55 directs the hot air away from the axis of the tool 45 and through a narrow rectangular tip 56. This applies the hot air more efficiently to the flooring material when carrying out the method of the invention.

It will be understood that FIGS. 8 and 9 illustrate exemplary embodiments of the tool 45 and the nozzle 53 and that other types of hot air welding tools and other nozzle geometries can be incorporated within the invention.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A method of installing flooring that is particularly useful for sanitary non-slip applications such as kitchens, the method comprising:
   positioning a first single layer sheet of polymer flooring material with an upwardly-facing step cut along one edge of the first sheet on a floor to be covered; and
   applying a second single layer sheet of polymer flooring material with a complementary downwardly-facing step cut along one edge of the second sheet to the upwardly facing step cut of the first sheet and to the floor adjacent the first sheet while concurrently sealing the respective faces to one another in a step lap joint.

2. A method according to claim 1 comprising positioning respective first and second sheets of thermoplastic material on the floor and applying sufficient heat to the respective step faces to melt the polymer.

3. A method according to claim 2 comprising positioning sheets of thermoplastic polymer that are selected from the group consisting of polypropylene, polyethylene, polystyrene, ABS (acrylonitrile-butadiene-styrene), nylon, polycarbonate, thermoplastic polyester, polyphenylene oxide, polysulfone and PEEK (poly-ether-ether-ketone).

4. A method according to claim 1 comprising positioning respective first and second sheets of thermosetting material on the floor and applying sufficient heat to the respective step faces to melt the polymer.

5. A method according to claim 4 comprising positioning sheets of thermosetting polymer that are selected from the group consisting of unsaturated polyester, vinyl ester, epoxy, urethane and phenolic.

6. A method according to claim 4 comprising positioning sheets of a polymer matrix composite resin system that includes reinforcing fibers selected from the group consisting of carbon, graphite, aramid polymers, glass, and combinations thereof.

7. A method according to claim 1 comprising:
   forming a step cut along one edge of a first sheet of thermoplastic polymer flooring material; and
   forming a complementary step cut along one edge of a second sheet of thermoplastic polymer flooring material;
   both prior to the step of positioning the first sheet on a floor to be covered with the step cut facing upwardly.

8. A method according to claim 1 comprising applying pressure to the surface of the second sheet above the downwardly facing step cut to seal the respective step cuts to one another in a step lap joint and thereby join the first and second sheets to one another.

9. A method according to claim 1 comprising positioning respective first and second sheets of polyvinyl chloride (PVC) thermoplastic material on the floor and applying sufficient heat to the respective step faces to melt the polymer.

10. A method according to claim 1 wherein each of the upwardly-facing step cut and the downwardly-facing step cut comprises an integral joint formed of a cut portion of each of the first and second single layer sheets, respectively.

11. A method according to claim 1 wherein at least one of the first and second sheets of polymer is a generally rectangular three-dimensional solid polymer in a thickness of at least about one quarter inch, a width of at least about four feet and a length of at least about six feet with the step cut along an edge of the rectangular three-dimensional flooring element.

12. A method according to claim 11, wherein both of the first and second sheets of polymer are generally rectangular three-dimensional solid polymers in a thickness of at least about one quarter inch, a width of at least about four feet and a length of at least about six feet with the step cut along an edge of the rectangular three-dimensional flooring element.

* * * * *